US012742984B2

(12) United States Patent
Liu et al.

(10) Patent No.: US 12,742,984 B2
(45) Date of Patent: Sep. 22, 2026

(54) WATERPROOF DOUBLE-SIDED LIQUID CRYSTAL SCREEN ELECTRONIC SHELF LABEL, AND SYSTEM

(71) Applicant: Hanshow Technology Co., Ltd., Jiaxing (CN)

(72) Inventors: Peixuan Liu, Jiaxing (CN); Linjiang Wang, Jiaxing (CN); Dan Wang, Jiaxing (CN); Ming Shen, Jiaxing (CN); Shiguo Hou, Jiaxing (CN); Hongming Xu, Jiaxing (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 200 days.

(21) Appl. No.: 18/700,161

(22) PCT Filed: Oct. 12, 2021

(86) PCT No.: PCT/CN2021/123231
§ 371 (c)(1),
(2) Date: Apr. 10, 2024

(87) PCT Pub. No.: WO2023/060426
PCT Pub. Date: Apr. 20, 2023

(65) Prior Publication Data
US 2024/0402525 A1 Dec. 5, 2024

(51) Int. Cl.
*G02F 1/1333* (2006.01)
*G09F 3/20* (2006.01)
*G09F 13/04* (2006.01)

(52) U.S. Cl.
CPC .. *G02F 1/133311* (2021.01); *G02F 1/133308* (2013.01); *G02F 1/133317* (2021.01);
(Continued)

(58) Field of Classification Search
None
See application file for complete search history.

(56) References Cited

FOREIGN PATENT DOCUMENTS

| | | | |
|---|---|---|---|
| AT | 14777 | U1 | 5/2016 |
| CN | 103885599 | A | 6/2014 |

(Continued)

OTHER PUBLICATIONS

Australia Patent Office, "Examination Report No. 1," issued in connection with Australian Patent Application No. 2021467848, dated Feb. 12, 2025, 3 pages.

(Continued)

*Primary Examiner* — Phu Vu
(74) *Attorney, Agent, or Firm* — Hanley, Flight & Zimmerman, LLC

(57) ABSTRACT

Disclosed in the present disclosure are a waterproof double-sided liquid crystal screen electronic shelf label and system, including: a main frame, a double-sided screen, a power connection and debugging member, and a fixing member. The double-sided screen is fixed in the main frame. The power connection and debugging member and the fixing member are located at a lateral side of the main frame. The power connection and debugging member is configured to supply power to the double-sided screen and debug the double-sided screen. The fixing member is configured to fix and mount the electronic shelf label. The double-sided screen is configured to display information on both sides of the double-sided screen. The present disclosure can achieve double-sided display by one electronic shelf label.

16 Claims, 10 Drawing Sheets

(52) U.S. Cl.
CPC ........ *G02F 1/133342* (2021.01); *G09F 3/204* (2013.01); *G09F 3/208* (2013.01); *G09F 13/0448* (2021.05); *G02F 2201/50* (2013.01)

(56) References Cited

FOREIGN PATENT DOCUMENTS

| | | | | |
|---|---|---|---|---|
| CN | 208060895 | U | * | 11/2018 |
| CN | 208608434 | U | | 3/2019 |
| CN | 208672964 | U | | 3/2019 |
| CN | 109723354 | A | * | 5/2019 |
| CN | 110379305 | A | | 10/2019 |
| CN | 209928845 | U | | 1/2020 |
| CN | 210489081 | U | * | 5/2020 |
| CN | 210630014 | U | | 5/2020 |
| CN | 111933041 | A | | 11/2020 |
| CN | 212782570 | U | * | 3/2021 |
| CN | 213303493 | U | | 5/2021 |
| JP | 2002500900 | A | | 1/2002 |
| JP | 2015056035 | A | | 3/2015 |
| WO | 9927824 | A1 | | 10/1999 |

OTHER PUBLICATIONS

International Searching Authority, "International Search Report," issued in connection with International Application No. PCT/CN2021/123231, dated Jul. 8, 2022, 7 pages.

International Searching Authority, "Written Opinion," issued in connection with International Application No. PCT/CN2021/123231, dated Jul. 8, 2022, 9 pages.

Japan Patent Office, "Office Action" issued for corresponding Japanese Patent Application 2024-521359 mailed on May 7, 2025, 8 pages, (English Translation Included).

European Patent Office, "Extended European Search Report," issued in connection with European Patent Application No. 21960176.2, dated Sep. 19, 2025, 10 pages.

* cited by examiner

WATERPROOF DOUBLE-SIDED LIQUID CRYSTAL SCREEN ELECTRONIC SHELF LABEL, AND SYSTEM

CROSS-REFERENCE TO RELATED APPLICATIONS

This patent arises from a U.S. National Stage of International Application No. PCT/CN2021/123231, filed Oct. 12, 2021, which is hereby incorporated by reference in its entirety.

TECHNICAL FIELD

The present disclosure relates to the technical field of electronic shelf labels, and particularly to a waterproof double-sided liquid crystal screen electronic shelf label and system.

BACKGROUND

This section is intended to provide a background or context for the embodiments of the present disclosure set forth in the claims. The description here is not admitted to be the prior art by virtue of its inclusion in this section.

Many usage scenarios, such as fresh food shelves and fresh food stacks, require an electronic shelf label to achieve double-sided display because there are goods on both sides and it is necessary to display different information and update the screens at different time. At present, the solution is to mount two electronic shelf labels, which are placed back-to-back, so that a large area is occupied, the impression is poor, and the mounting is complicated since two shelf labels should be mounted separately and then aligned. The two shelf labels will lead to more energy consumption and maintenance. As for the mounting mode of the electronic shelf label, the prior art adopts external wiring or two electric guide rails, so that an extension structure is rotatably connected to the guide rails through a contact piece, but the waterproof performance will be degraded in case of exposure to a humid environment for a long time. Due to the complex usage scenarios, there will be long-distance goods in front of most of the electronic shelf labels, and the complicated mounting will bring great difficulties to the assembly and dismounting.

SUMMARY

The embodiments of the present disclosure provide a waterproof double-sided liquid crystal screen electronic shelf label to solve the problem caused by mounting two electronic shelf labels. The electronic shelf label includes: a main frame, a double-sided screen, a power connection and debugging member and a fixing member. The double-sided screen is fixed in the main frame, and the power connection and debugging member and the fixing member are located at a lateral side of the main frame. The power connection and debugging member is configured to supply power to the double-sided screen and debug the double-sided screen. The fixing member is configured to fix and mount the electronic shelf label. The double-sided screen is configured to display information on both sides of the double-sided screen.

In an embodiment, the main frame includes an external housing which includes a mounting hole, and a lateral side of each screen of the double-sided screen is provided with a mounting hole. Through the mounting hole at the lateral side of the screen and the mounting hole of the external housing, each screen of the double-sided screen is fixed in the main frame by screws.

In an embodiment, the main frame includes an external housing which includes a buckle, and a lateral side of each screen of the double-sided screen is provided with a buckle. Each screen of the double-sided screen is fixed in the main frame through the buckle at the lateral side of the screen and the buckle of the external housing.

In an embodiment, the main frame includes an external housing, to which each screen of the double-sided screen is fixed by adhesive dispensing.

In an embodiment, each screen of the double-sided screen comprises a lens and a display screen, and the lens is pressed on the display screen through foam glue stuck to a back side of the lens.

In an embodiment, two screens of the double-sided screen are fixed in the main frame from end to end to enhance heat dissipation.

In an embodiment, the waterproof double-sided liquid crystal screen electronic shelf label further includes an accessory fool-proofing structure located at the lateral side of the main frame. The accessory fool-proofing structure is configured to constrain the mounting of an external power taking device.

In an embodiment, the waterproof double-sided liquid crystal screen electronic shelf label further includes a waterproof rubber ring, on which the power connection and debugging member is mounted by extrusion. The waterproof rubber ring is configured for sealing and waterproofing.

In an embodiment, the double-sided screen includes two screens, which are closely attached to a middle frame of a product.

In an embodiment, there are two sets of the power connection and debugging members and the fixing members, in which one set of the power connection and debugging member and the fixing member are located at one lateral side of the double-sided screen, the other set of the power connection and debugging member and the fixing member are located at an adjacent lateral side of the double-sided screen, so that the two sets of the power connection and debugging members and the fixing members are mounted in both horizontal and vertical directions.

The embodiments of the present disclosure provide a waterproof double-sided liquid crystal screen electronic shelf label system, including the aforementioned waterproof double-sided liquid crystal screen electronic shelf label, a power taking device and an electrifying guide rail. The waterproof double-sided liquid crystal screen electronic shelf label is fixedly mounted with the power taking device, and the power taking device is mounted on the electrifying guide rail. The power taking device is configured to supply power to the waterproof double-sided liquid crystal screen electronic shelf label through the electrifying guide rail.

In an embodiment, the power taking device includes an electrifying device, a main frame and a dismounting device, and the electrifying device and the dismounting device are mounted on the main frame. The electrifying device is configured to obtain power from the electrifying guide rail and supply power to the waterproof double-sided liquid crystal screen electronic shelf label. The dismounting device is configured to enable the power taking device to be conveniently mounted on and dismounted from the electrifying guide rail.

In an embodiment, the electrifying device is an elastic sheet located in the main frame and extending out of the main frame. The elastic sheet extending out of the main frame is configured to obtain power from the electrifying guide rail, and a bottom of the elastic sheet located in the main frame is pressed on the power connection and debugging member of the waterproof double-sided liquid crystal screen electronic shelf label to supply power to the waterproof double-sided liquid crystal screen electronic shelf label.

In an embodiment, the dismounting device is located at both ends of the main frame, and the dismounting device includes a dismounting button and an elastic buckle that is extended out of the main frame. During mounting, the power taking device is clamped on the electrifying guide rail through the elastic buckle extending out of the main frame. During dismounting, the dismounting button is pressed to cause the elastic buckle to retract into the main frame, so that the power taking device is separated from the electrifying guide rail.

In an embodiment, the power taking device further includes a fixing via-hole, and is fixedly mounted through the fixing via-hole and the fixing device of the waterproof double-sided liquid crystal screen electronic shelf label.

In an embodiment, the power taking device further includes a fool-proofing member, which is matched with an accessory fool-proofing structure on the waterproof double-sided liquid crystal screen electronic shelf label to constrain the mounting of the power taking device.

In an embodiment, the electrifying guide rail includes a guide rail copper bar, through which the waterproof double-sided liquid crystal screen electronic shelf label is electrified.

In an embodiment, the electrifying guide rail includes rotating devices located at both ends of the electrifying guide rail. When the waterproof double-sided liquid crystal screen electronic shelf label is subjected to an external force, the rotating device of the electrifying guide rail rotates in a forced direction of the waterproof double-sided liquid crystal screen electronic shelf label, so as to reduce an impact force applied to the waterproof double-sided liquid crystal screen electronic shelf label by the external force.

In order to solve the problem that the usage scenarios, such as fresh food shelves and fresh food stacks, require an electronic shelf label to achieve double-sided display because there are goods on both sides and it is necessary to display different information and update the screens at different time, the technical solution in the prior art is to mount two electronic shelf labels. Compared with the technical solution in the prior art, the embodiments of the present disclosure provide a waterproof double-sided liquid crystal screen electronic shelf label, including: a main frame, a double-sided screen, a power connection and debugging member, and a fixing member, in which the double-sided screen is fixed in the main frame, and the power connection and debugging member and the fixing member are located a lateral side of the main frame. The power connection and debugging member is configured to supply power to the double-sided screen and debug the double-sided screen. The fixing member is configured to fix and mount the electronic shelf label The double-sided screen is configured to display information on both sides of the double-sided screen. Therefore, one electronic shelf label can achieve double-sided display, so that the occupied area is small, the impression is good, the mounting is simple.

In addition, it is possible to realize horizontal and vertical mounting of the electronic shelf label, waterproof, anti-collision, and convenient mounting and dismounting.

BRIEF DESCRIPTION OF DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DETAILED DESCRIPTION OF EMBODIMENTS

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

Figure 1:
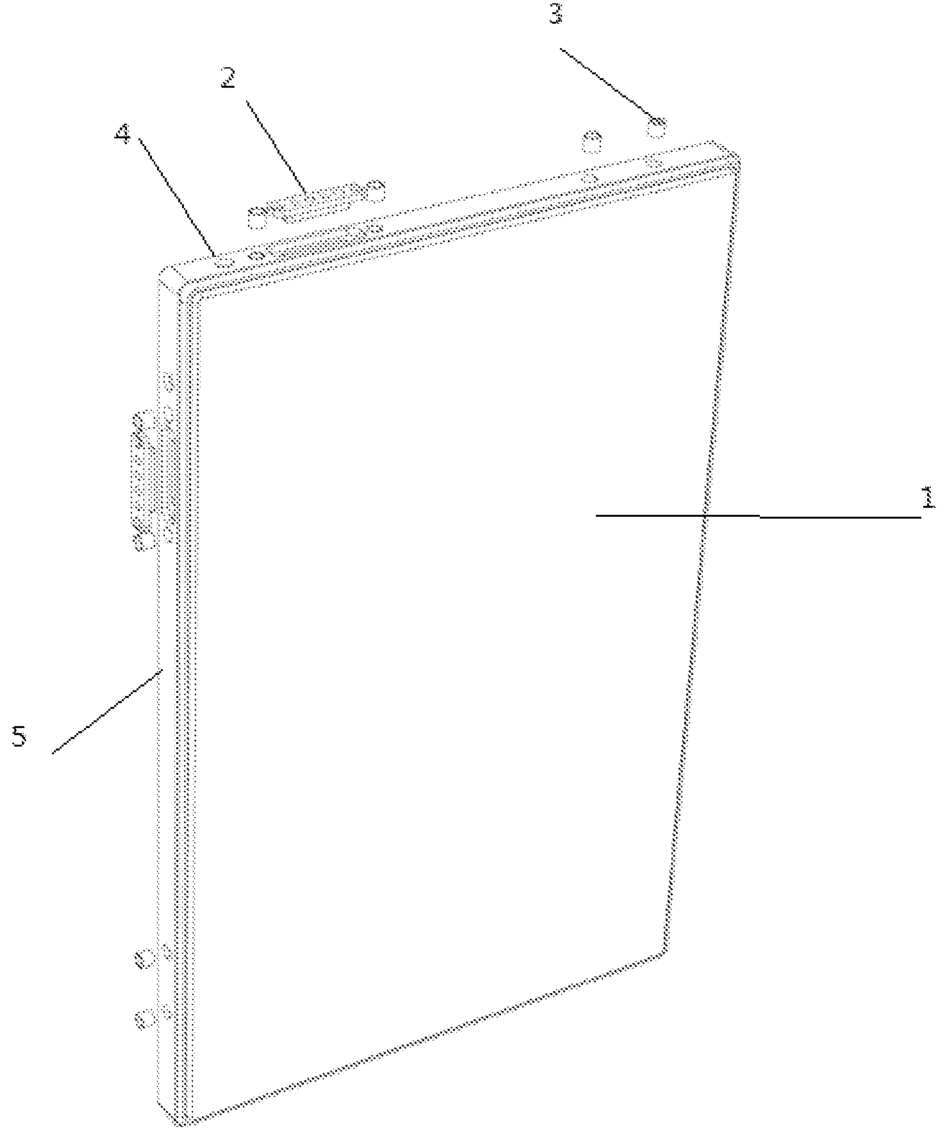
FIG. 1 illustrates a first structural diagram of a waterproof double-sided liquid crystal screen electronic shelf label according to an embodiment of the present disclosure.

FIG. 1 illustrates a first structural diagram of a waterproof double-sided liquid crystal screen electronic shelf label according to an embodiment of the present disclosure. As illustrated in FIG. 1, the waterproof double-sided liquid crystal screen electronic shelf label includes a main frame 5, a double-sided screen 1, a power connection and debugging member 2, and a fixing member 3. The double-sided screen is fixed in the main frame, and the power connection and debugging member and the fixing member are located at a lateral side of the main frame.

The power connection and debugging member is configured to supply power to the double-sided screen and debug the double-sided screen.

The fixing member is configured to fix and mount the electronic shelf label;

The double-sided screen is configured to display information on both sides of the double-sided screen.

Figure 2:
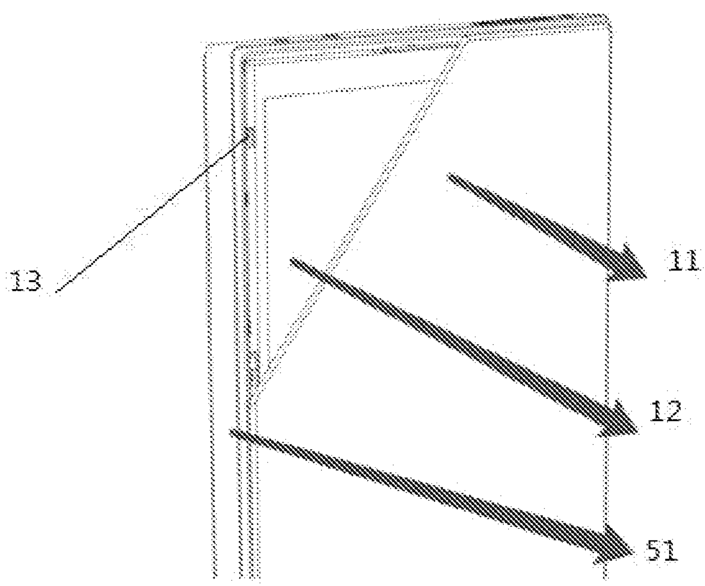
FIG. 2 illustrates a second structural diagram of a waterproof double-sided liquid crystal screen electronic shelf label according to an embodiment of the present disclosure.

In an embodiment of the present disclosure, as illustrated in FIG. 2, the main frame may include an external housing 51, which includes a mounting hole, and a lateral side of each screen of the double-sided screen is provided with a mounting hole 13. Through the mounting hole at the lateral side of the screen and the mounting hole of the external housing, each screen of the double-sided screen is fixed in the main frame by screws.

In an embodiment of the present disclosure, as illustrated in FIG. 2, the main frame includes an external housing 51 which includes a buckle, and a lateral side of each screen of the double-sided screen is provided with a buckle 13. Each screen of the double-sided screen is fixed in the main frame through the buckle at the lateral side of the screen and the buckle of the external housing.

In an embodiment of the present disclosure, the main frame includes an external housing 51, to which each screen of the double-sided screen is fixed by adhesive dispensing. A lens is connected to the housing by adhesive dispensing, thereby effectively achieving a waterproof effect.

Specifically, reference numeral 13 illustrated in FIG. 2 may be a mounting hole or a buckle, mainly for the purpose of fixing the screen to the main frame.

Specifically, as illustrated in FIG. 1, the main frame 5 is a rectangular frame and may be made of a plastic material. The frame is provided with the power connection and debugging member 2 and the fixing member 3. The power connection and debugging member 2 supplies power to the shelf label and debugs the device interface. The fixing member 3 may be hot-melt copper nut to connect a fixing accessory to achieve the purpose of firm fixing. The double-sided screen 1 has front and back screens, which are closely attached to the main frame to reduce the occupied space, beautify the display effect, and reduces the cost, and this thin and light product makes the display effect more outstanding.

In an embodiment of the present disclosure, as illustrated in FIG. 2, each screen of the double-sided screen includes a lens 11 and a display screen 12. The lens is pressed on the display screen through foam glue stuck to a back side of the lens (or through a double-sided adhesive tape). By pressing the lens on the screen through the foam glue stuck to the back side of the lens, the lens can be protected.

Adhesive dispensing is a widely used process, also known as sizing, gluing, potting, dripping, etc., which refers to the application, potting or dripping of electronic glue, oil or other liquid on a product, so that the product can achieve the effect such as sticking, potting, insulating, fixing and surface smoothing.

Specifically, the display screen is an LCD screen. The buckling mode is to fix the screen by clamping an edge of the lens 11.

In an embodiment of the present disclosure, the two screens of the double-sided screen are fixed in the main frame in a manner that a head of each one of the two screens corresponds to a tail of the other one of the two screens, so as to enhance heat dissipation.

Figure 3:
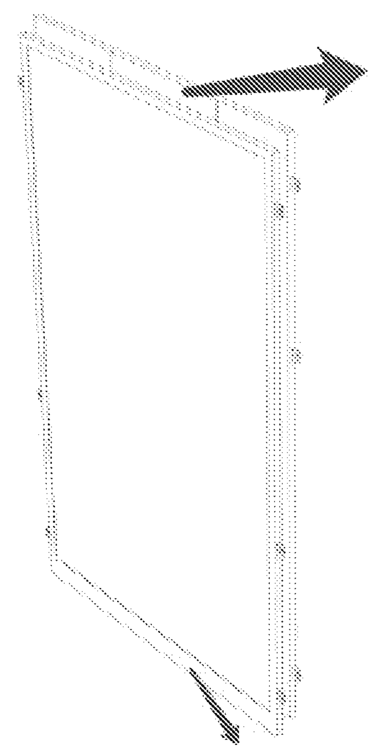
FIG. 3 illustrates a third structural diagram of a waterproof double-sided liquid crystal screen electronic shelf label according to an embodiment of the present disclosure.

Specifically, each arrow in FIG. 3 indicates a wide edge position of the screen where heat is generated. Therefore, by placing the two screens in a manner that a head of each one of the two screens corresponds to a tail of the other one of the two screens, it is possible to avoid two heat generation spots of the two screens being located close to each other, and also can increase the heat dissipation space.

In an embodiment of the present disclosure, as illustrated in FIG. 1, the electronic shelf label further includes an accessory fool-proofing structure 4 located at the lateral side of the main frame. The accessory fool-proofing structure is configured to constrain the mounting of an external power taking device.

Specifically, the accessory fool-proofing structure is configured to constrain the mounting and reduce incorrect assemblies. The accessory fool-proofing structure is a hole, which is mainly for the purposes of accessory locating and accessory fool-proofing.

Fool-proofing is a behavior constraint means for prevention and remedy, which applies a constraint method to avoid mistakes, so that an operator can intuitively complete a correct operation without attention, experience or professional knowledge.

Figure 4:
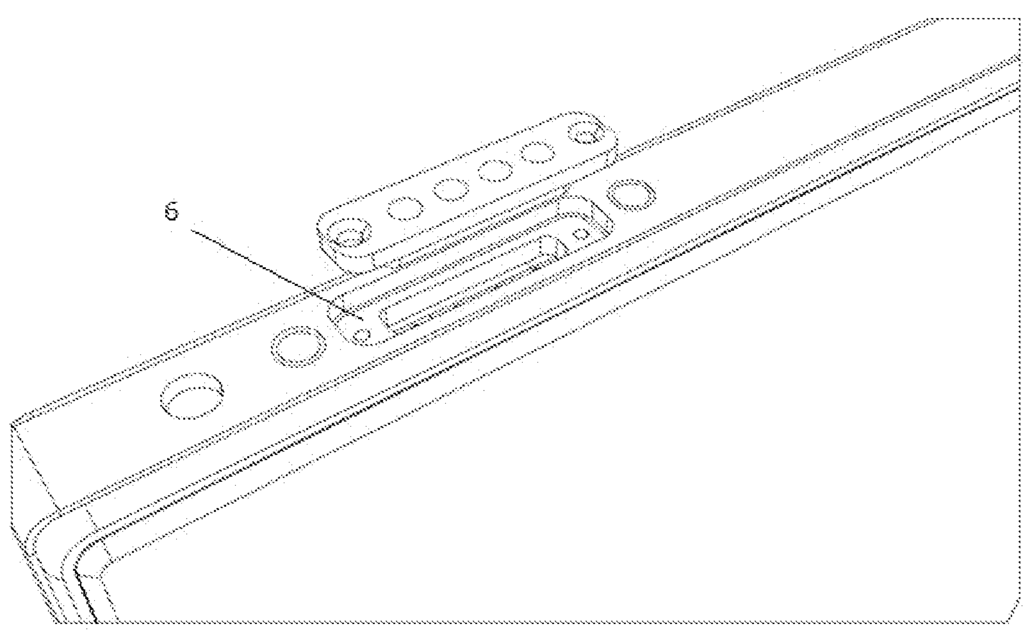
FIG. 4 illustrates a fourth structural diagram of a waterproof double-sided liquid crystal screen electronic shelf label according to an embodiment of the present disclosure.

In an embodiment of the present disclosure, as illustrated in FIG. 4, the electronic shelf label further includes a waterproof rubber ring 6, on which the power connection and debugging member is mounted by extrusion. The waterproof rubber ring is used for sealing and waterproofing.

Figure 5:
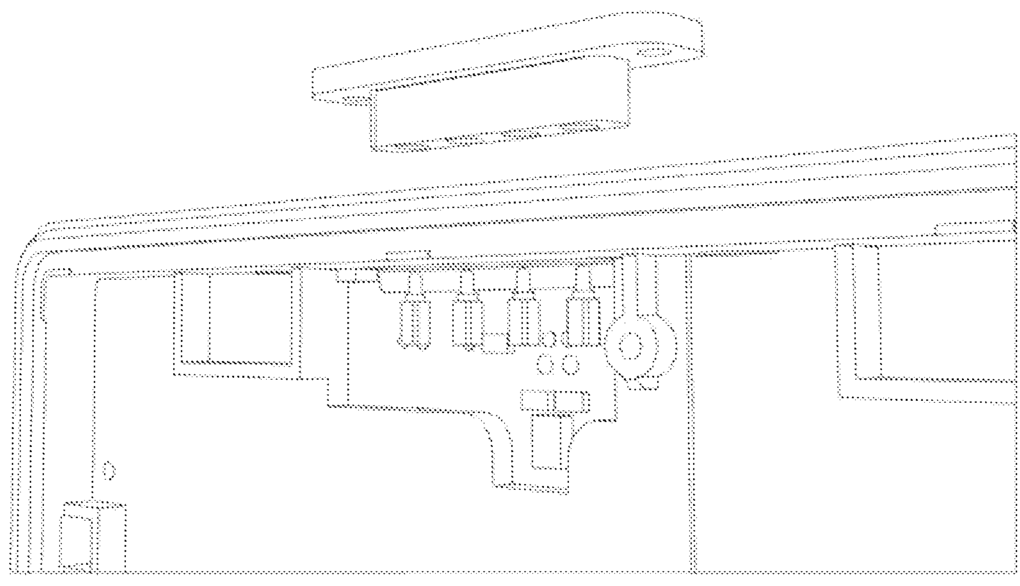
FIG. 5 illustrates a fifth structural diagram of a waterproof double-sided liquid crystal screen electronic shelf label according to an embodiment of the present disclosure.

In an embodiment of the present disclosure, as illustrated in FIG. 5, the power connection and debugging member 2 elastically presses an external contact point through a pogo pin 7 that is used for power connection, so that the performance is more stable and the waterproof effect is better.

The pogo pin is a precision connector used in electronic products such as mobile phones, and is widely used in semiconductor devices for connection. There are different appearances depending on various applications, but as a whole, the pogo pin has a precision spring structure inside. The surface of the product is generally gold-plated, and the spring may also be gold-plated according to the process requirement.

Figure 6:
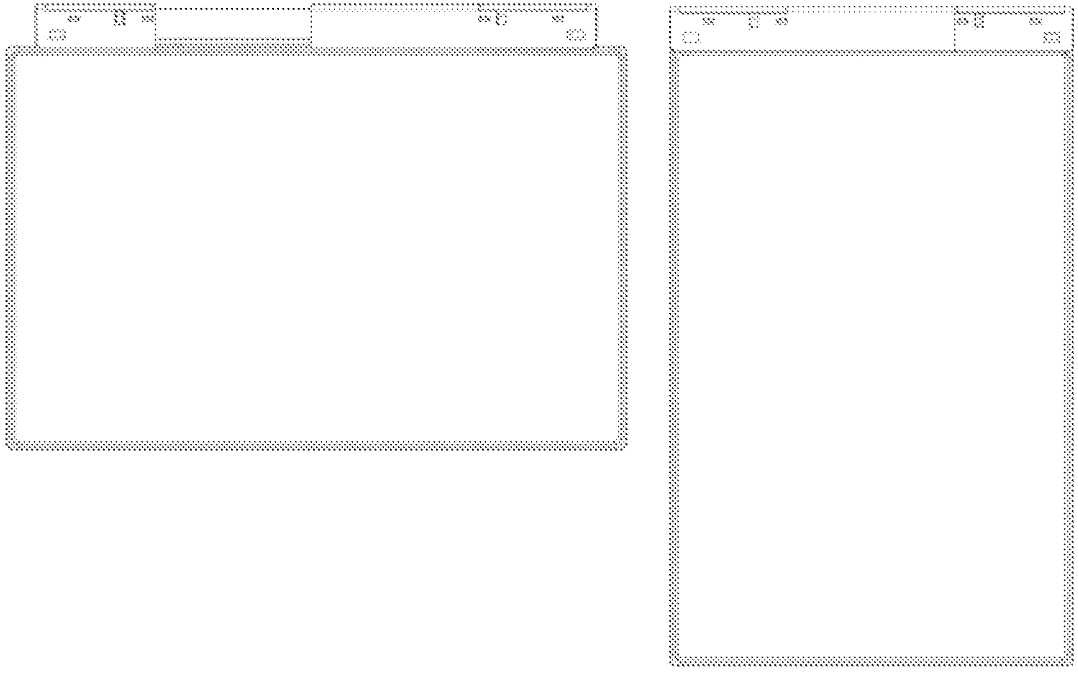
FIG. 6 illustrates a sixth structural diagram of a waterproof double-sided liquid crystal screen electronic shelf label according to an embodiment of the present disclosure.

In an embodiment of the present disclosure, as illustrated in FIGS. 1 and 6, there may be two sets of the power connection and debugging members and the fixing members. One set of the power connection and debugging member and the fixing member are located at one lateral side of the double-sided screen, and the other set of the power connection and debugging member and the fixing member are located at an adjacent lateral side of the double-sided screen, so that the two sets of the power connection and debugging members and the fixing members are mounted in both horizontal and vertical directions, thus the screen can be mounted either horizontally or vertically.

Of course, there may also be one set of the power connection and debugging member and the fixing member, which may be located on a wide side or a long side of the screen, so that horizontal mounting and vertical mounting can be realized.

The waterproof double-sided liquid crystal screen electronic shelf label includes a circuit board, which includes a pogo pin as illustrated in FIG. 5, through which the circuit board is connected to the two screens to supply power thereto.

Figure 7:
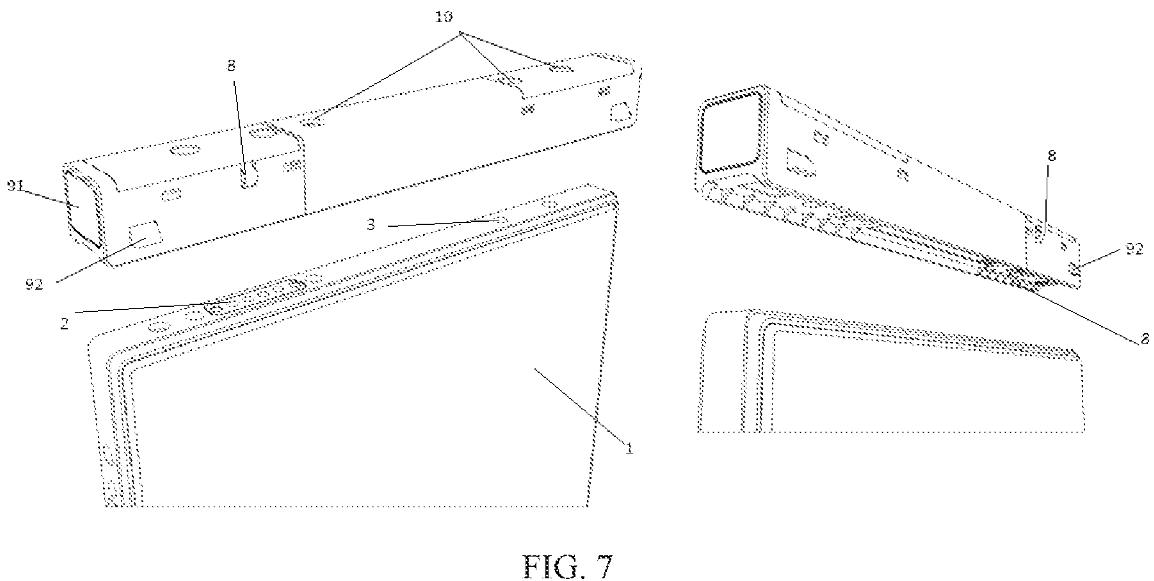
FIG. 7 illustrates a first structural diagram of a waterproof double-sided liquid crystal screen electronic shelf label system according to an embodiment of the present disclosure.
Figure 8:
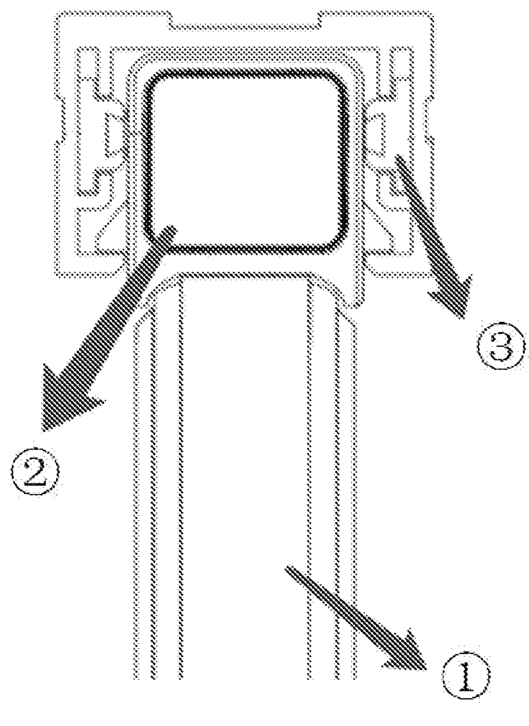
FIG. 8 illustrates a second structural diagram of a waterproof double-sided liquid crystal screen electronic shelf label system according to an embodiment of the present disclosure.

The present disclosure further provides a waterproof double-sided liquid crystal screen electronic shelf label system, as illustrated in FIGS. 7 and 8, including a waterproof double-sided liquid crystal screen electronic shelf label ①, a power taking device ② and an electrifying guide rail ③ (not illustrated in FIG. 7). The waterproof double-sided liquid crystal screen electronic shelf label is fixedly mounted with the power taking device, and the power taking device is mounted on the electrifying guide rail. The power taking device is configured to electrify the waterproof double-sided liquid crystal screen electronic shelf label through the electrifying guide rail.

In an embodiment of the present disclosure, the power taking device includes an electrifying device, a main frame and a dismounting device, and the electrifying device and the dismounting device are mounted on the main frame.

The electrifying device is configured to obtain power from the electrifying guide rail and supply power to the waterproof double-sided liquid crystal screen electronic shelf label.

The dismounting device is configured to enable the power taking device to be conveniently mounted on and dismounted from the electrifying guide rail.

In an embodiment of the present disclosure, as illustrated in FIG. 7, the electrifying device is an elastic sheet 8 located in the main frame and extending out of the main frame.

The elastic sheet extending out of the main frame is configured to obtain power from the electrifying guide rail. A bottom of the elastic sheet located in the main frame is pressed on the power connection and debugging member 2 of the waterproof double-sided liquid crystal screen electronic shelf label to supply power to the waterproof double-sided liquid crystal screen electronic shelf label. That is, a top portion of the elastic sheet 8 is connected to the electrifying guide rail, and the bottom portion of the elastic sheet 8 is pressed on a dot of the shelf label.

Figure 9:
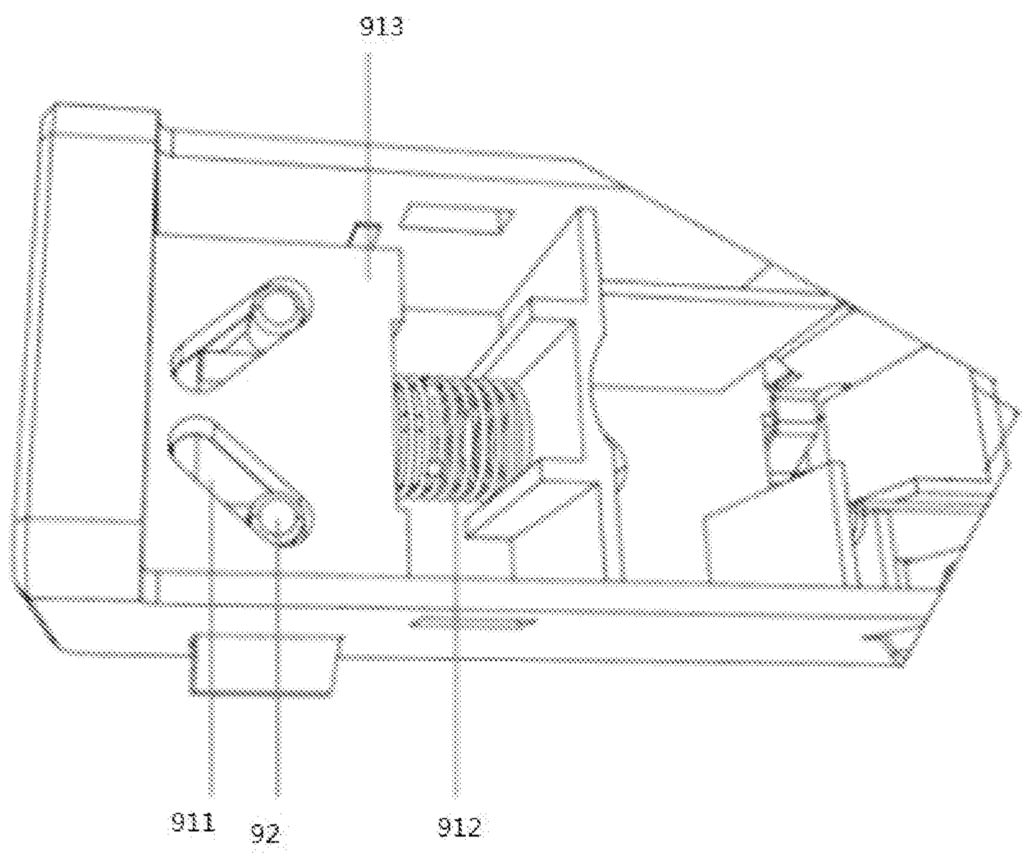
FIG. 9 illustrates a first internal structural diagram of a dismounting device (a dismounting button is not pressed) according to an embodiment of the present disclosure.

In an embodiment of the present disclosure, as illustrated in FIG. 9, the dismounting devices are located at both ends of the main frame. The dismounting device includes a dismounting button 91 and an elastic buckle 92 that is extended out of the main frame.

During mounting, the power taking device is clamped on the electrifying guide rail through the elastic buckle that is extended out of the main frame. During dismounting, the dismounting button is pressed to cause the elastic buckle to retract into the main frame, so that the power taking device is separated from the electrifying guide rail.

Figure 10:
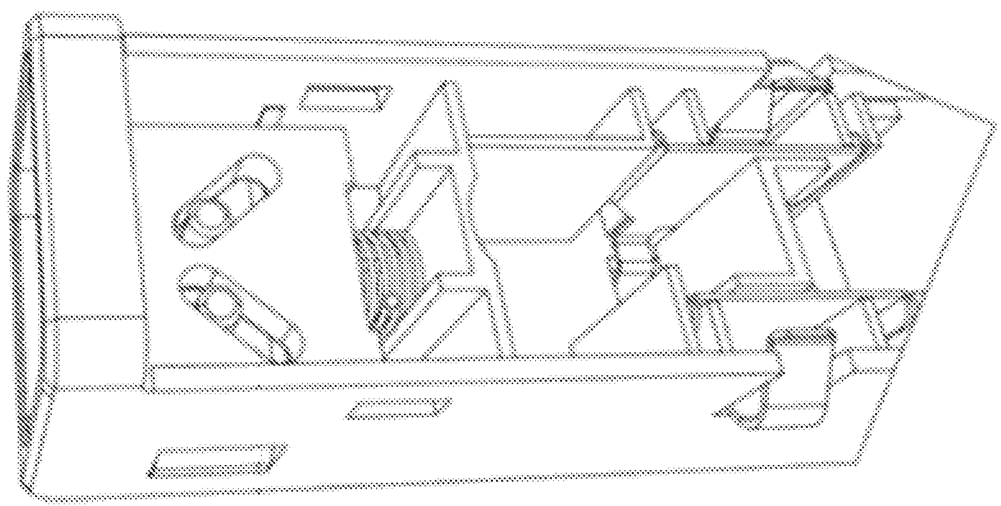
FIG. 10 illustrates a second internal structural diagram of a dismounting device (a dismounting button is pressed) according to an embodiment of the present disclosure.
Figure 11:
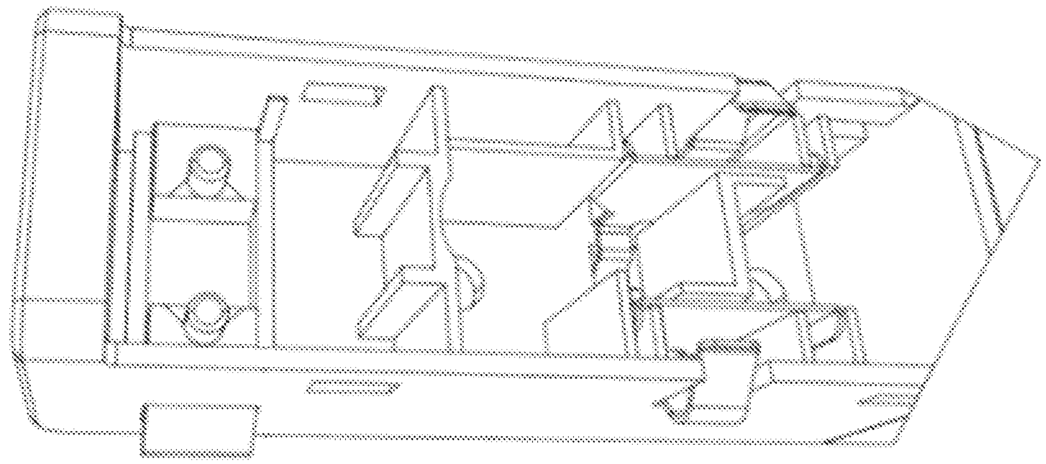
FIG. 11 illustrates a third internal structural diagram of a dismounting device according to an embodiment of the present disclosure.

In an embodiment of the present disclosure, as illustrated in FIGS. 9 to 11, the dismounting button of the dismounting device includes a buckle guide groove 911, a spring 912 and a key 913. When the key 913 is pressed, the elastic buckles 92 retract under the influence of the buckle guide grooves 911 disposed in two directions. When the key 913 is released, the spring 912 rebounds, and the elastic buckle 92 rebounds outward under the influence of the buckle guide grooves 911.

FIG. 11 illustrates a structure exposed after the key and spring are removed, and the buckle is placed in the groove.

In an embodiment of the present disclosure, as illustrated in FIG. 7, the power taking device further includes a fixing via-hole 10, and the power taking device is fixedly mounted through the fixing via-hole and the fixing device of the waterproof double-sided liquid crystal screen electronic shelf label.

In an embodiment of the present disclosure, the power taking device further includes a fool-proofing member, which is matched with an accessory fool-proofing structure on the waterproof double-sided liquid crystal screen electronic shelf label to constrain the mounting of the power taking device.

Figure 12:
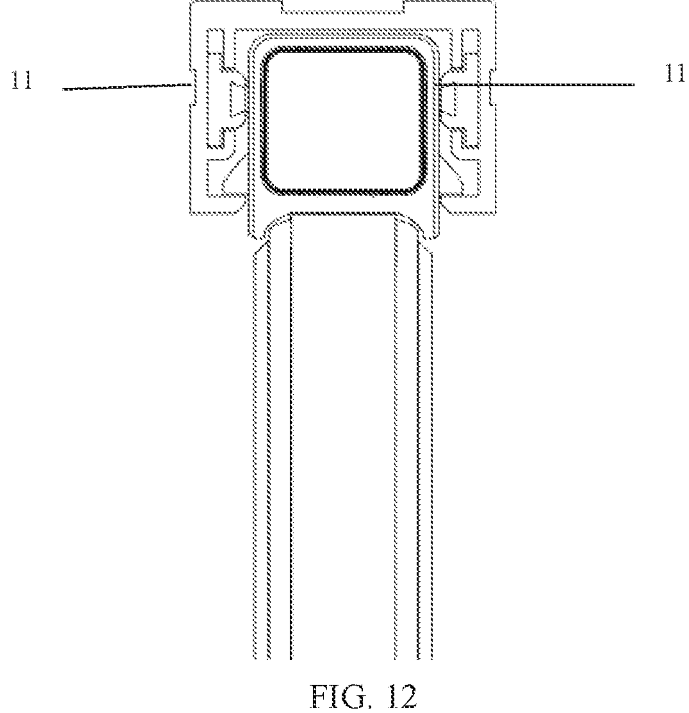
FIG. 12 illustrates a structural diagram of an electrifying guide rail according to an embodiment of the present disclosure.

In an embodiment of the present disclosure, as illustrated in FIG. 12, the electrifying guide rail includes a guide rail copper bar 11, through which the waterproof double-sided liquid crystal screen electronic shelf label is electrified.

During mounting, the waterproof double-sided liquid crystal screen electronic shelf label with the power taking device is directly inserted into the electrifying guide rail, the elastic sheets 8 at both sides of the power taking device press the guide rail copper bar 11 of the guide rail, and the elastic buckles 92 on both sides of the power taking device are clamped on the guide rail for fixation. During dismounting, the dismounting buttons 91 at both ends are pressed by fingers to remove the shelf label.

Figure 13:
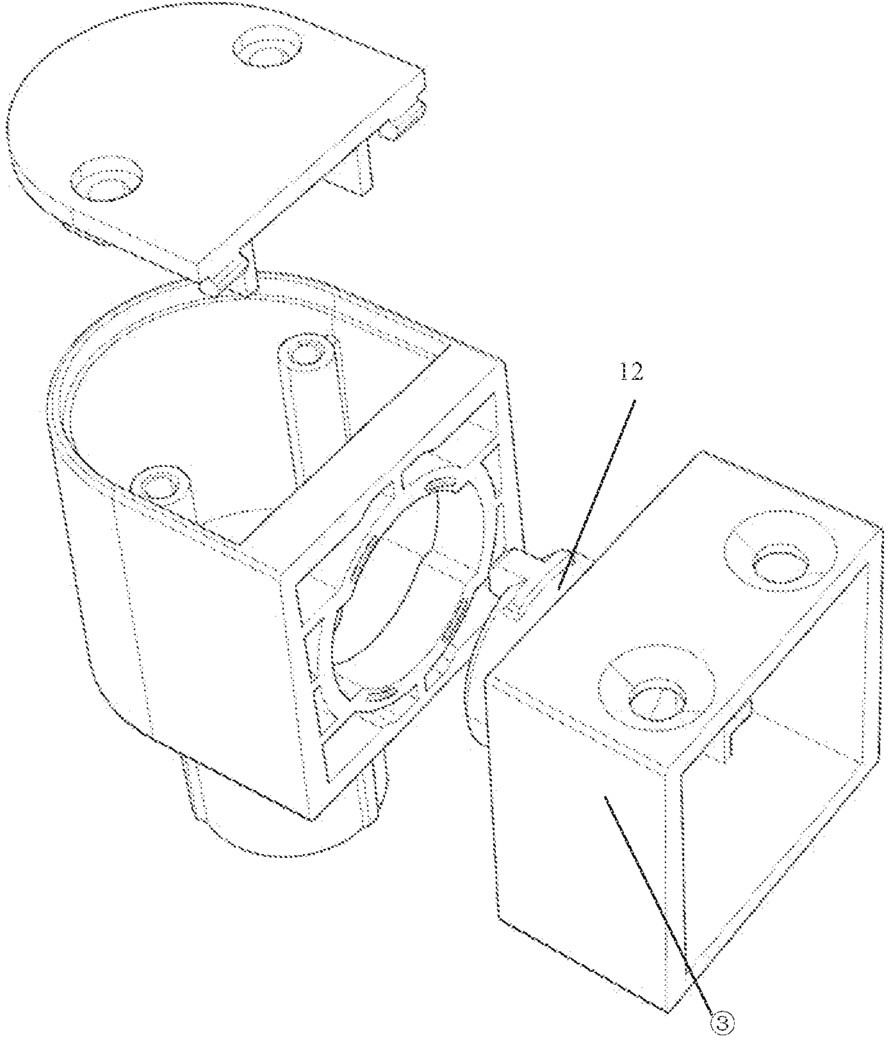
FIG. 13 illustrates a first structural diagram of a rotating part of an electrifying guide rail according to an embodiment of the present disclosure.
Figure 14:
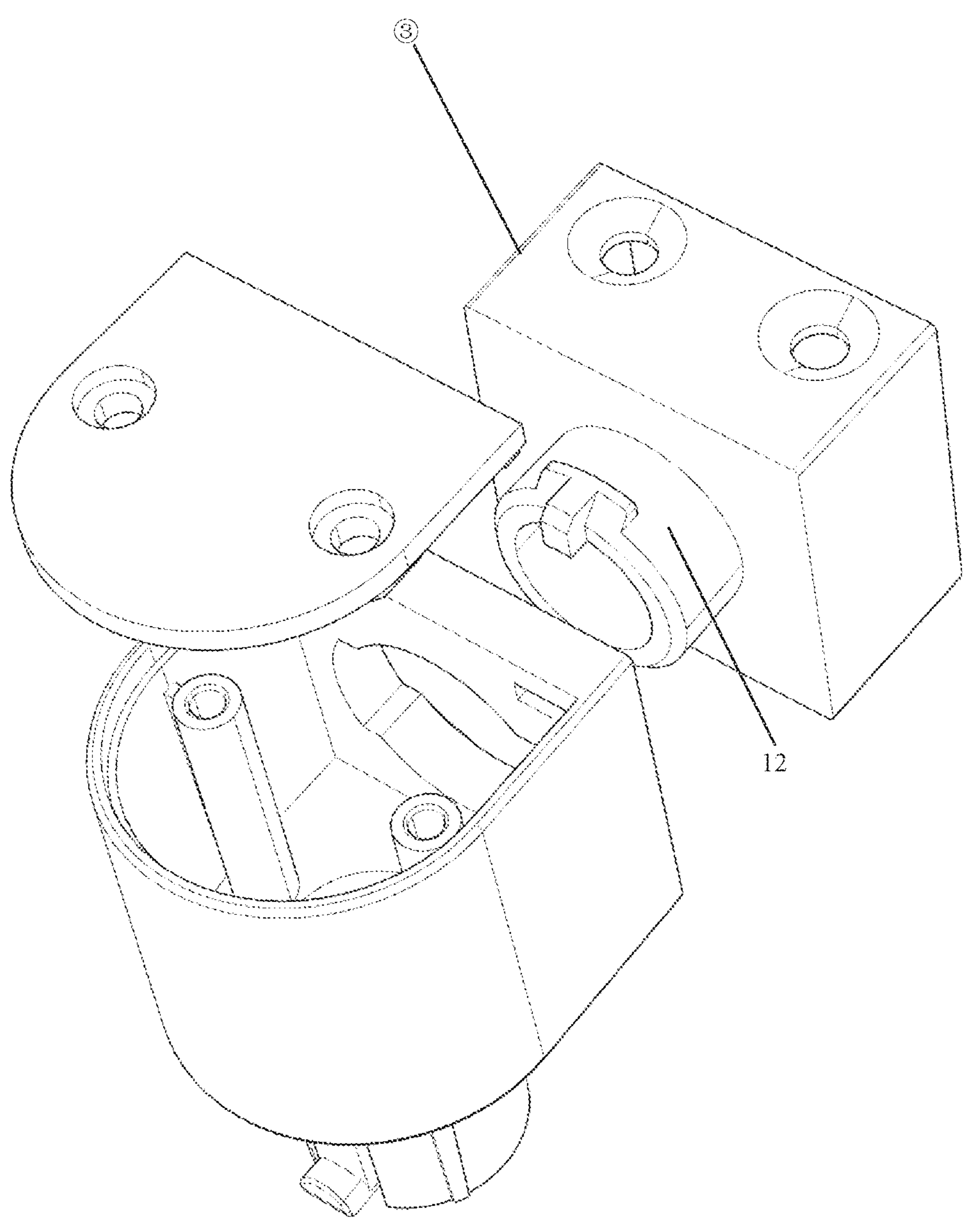
FIG. 14 illustrates a second structural diagram of a rotating part of an electrifying guide rail according to an embodiment of the present disclosure.

In an embodiment of the present disclosure, as illustrated in FIGS. 13 and 14, the electrifying guide rail includes rotating devices 12 located at both ends of the electrifying guide rail and inserted into a fixing device, and the fixing device is used to support the electrifying guide rail and the electronic shelf label, so that the electrifying guide rail and the electronic shelf label can be placed anywhere.

Figure 15:
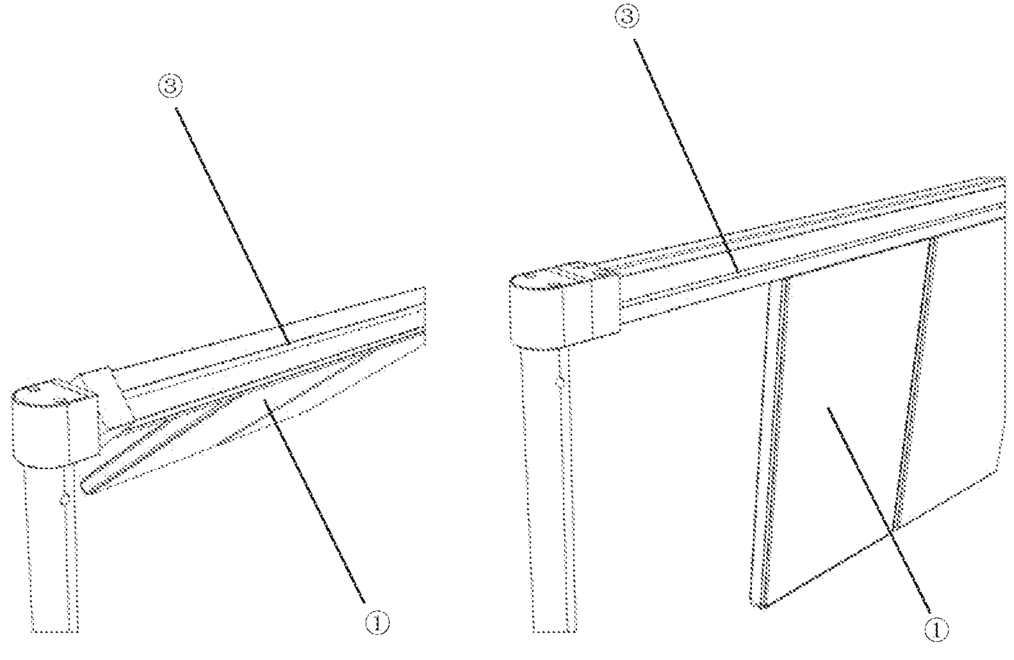
FIG. 15 illustrates a schematic diagram in which an electrifying guide rail is rotated when a force is applied to an electronic shelf label according to an embodiment of the present disclosure.

When the waterproof double-sided liquid crystal screen electronic shelf label is subjected to an external force, the rotating devices of the electrifying guide rail rotates in a forced direction of the waterproof double-sided liquid crystal screen electronic shelf label, so as to reduce an impact force applied to the waterproof double-sided liquid crystal screen electronic shelf label by the external force, as illustrated in FIG. 15.

In addition, there is a movable space at a joint between the shelf label and the guide rail to buffer a part of the impact force.

In order to solve the problem that the usage scenarios, such as fresh food shelves and fresh food stacks, require an electronic shelf label to achieve double-sided display because there are goods on both sides and it is necessary to display different information and update the screens at different time, the technical solution in the prior art is to mount two electronic shelf labels. Compared with the technical solution in the prior art, the embodiments of the present disclosure provide a waterproof double-sided liquid crystal screen electronic shelf label, including: a main frame, a double-sided screen, a power connection and debugging member, and a fixing member, in which the double-sided screen is fixed in the main frame, and the power connection and debugging member and the fixing member are located at a lateral side of the main frame. The power connection and debugging member is configured to supply power to the double-sided screen and debug the double-sided screen. The fixing member is configured to fix and mount the electronic shelf label. The double-sided screen is configured to display information on both sides of the double-sided screen. Therefore, one electronic shelf label can achieve double-sided display, so that the occupied area is small, the impression is good, the mounting is simple, and the product is the thinnest (with a thickness of 14.4 mm).

In addition, it is possible to realize horizontal and vertical mounting of the electronic shelf label, waterproof, anti-collision, and convenient mounting and dismounting, prevent the mounting wires from being exposed, and realize the high adaptability of accessories.

The purpose, technical features and technical effects of the present disclosure have been further described above by means of some embodiments. It should be understood that the embodiments are meant to facilitate understanding of the principles of the present disclosure, rather than limit the scope of the present disclosure. Any modifications, alternations, improvements, etc., made by those skilled in the art without departing from the concepts and principles of this disclosure shall fall within the scope of the present disclosure.

The invention claimed is:

1. A waterproof double-sided liquid crystal screen electronic shelf label, comprising: a main frame, a double-sided screen, a power connection member, and a fixing member;
   wherein the double-sided screen is fixed in the main frame, and the power connection member and the fixing member are located at a lateral side of the main frame;
   the power connection member is configured to supply power to the double-sided screen;
   the fixing member is configured to fix and mount the main frame of the electronic shelf label; and
   the double-sided screen is configured to display information on both sides of the double-sided screen;
   wherein the waterproof double-sided liquid crystal screen electronic shelf label further comprises a power taking device, which is fixedly mounted with the main frame through the fixing member, and is configured to supply power to the waterproof double-sided liquid crystal screen electronic shelf label through an electrifying guide rail;
   the power taking device comprises an elastic sheet, a bottom portion of the elastic sheet is connected to the power connection member, and a top portion of the elastic sheet is configured to press against the electrifying guide rail to supply power to the waterproof double-sided liquid crystal screen electronic shelf label.

2. The waterproof double-sided liquid crystal screen electronic shelf label according to claim 1, wherein the main frame comprises an external housing which comprises a mounting hole, and a lateral side of each screen of the double-sided screen is provided with a mounting hole; and
   through the mounting hole at the lateral side of the screen and the mounting hole of the external housing, each screen of the double-sided screen is fixed in the main frame by screws.

3. The waterproof double-sided liquid crystal screen electronic shelf label according to claim 1, wherein the main frame comprises an external housing which comprises a buckle, and a lateral side of each screen of the double-sided screen is provided with a buckle; and
   each screen of the double-sided screen is fixed in the main frame through the buckle at the lateral side of the screen and the buckle of the external housing.

4. The waterproof double-sided liquid crystal screen electronic shelf label according to claim 1, wherein the main frame comprises an external housing, to which each screen of the double-sided screen is fixed by adhesive dispensing.

5. The waterproof double-sided liquid crystal screen electronic shelf label according to claim 1, wherein each screen of the double-sided screen comprises a lens and a display screen, and the lens is pressed on the display screen through foam glue stuck to a back side of the lens.

6. The waterproof double-sided liquid crystal screen electronic shelf label according to claim 1, wherein two screens of the double-sided screen are fixed in the main frame in a manner that a head of each one of the two screens corresponds to a tail of the other one of the two screens, to enhance heat dissipation.

7. The waterproof double-sided liquid crystal screen electronic shelf label according to claim 1, wherein the double-sided screen comprises two screens, which are closely attached to a middle frame of a product.

8. The waterproof double-sided liquid crystal screen electronic shelf label according to claim 1, wherein there are two sets of the power connection members and the fixing members, wherein one set of the power connection member and the fixing member are located at one lateral side of the double-sided screen, the other set of the power connection member and the fixing member are located at an adjacent lateral side of the double-sided screen, so that the two sets of the power connection members and the fixing members are mounted in both horizontal and vertical directions.

9. A waterproof double-sided liquid crystal screen electronic shelf label system, comprising: the waterproof double-sided liquid crystal screen electronic shelf label according to claim 1, and an electrifying guide rail;
   wherein the power taking device is mounted on the electrifying guide rail.

10. The waterproof double-sided liquid crystal screen electronic shelf label system according to claim 9, wherein the power taking device comprises an electrifying device, a main frame and a dismounting device, and the electrifying device and the dismounting device are mounted on the main frame;
   the electrifying device is configured to obtain power from the electrifying guide rail and supply power to the waterproof double-sided liquid crystal screen electronic shelf label, and the electrifying device is the elastic sheet; and
   the dismounting device is configured to enable the power taking device to be conveniently mounted on and dismounted from the electrifying guide rail.

11. The waterproof double-sided liquid crystal screen electronic shelf label system according to claim 10, wherein the elastic sheet is located in the main frame and extending out of the main frame; and
   the elastic sheet extending out of the main frame is configured to obtain power from the electrifying guide rail, and the bottom portion of the elastic sheet located in the main frame is pressed on the power connection member of the waterproof double-sided liquid crystal screen electronic shelf label to supply power to the waterproof double-sided liquid crystal screen electronic shelf label.

12. The waterproof double-sided liquid crystal screen electronic shelf label system according to claim 10, wherein the dismounting device is located at both ends of the main frame; and the dismounting device comprises a dismounting button and an elastic buckle that is extended out of the main frame; and
   during mounting, the power taking device is clamped on the electrifying guide rail through the elastic buckle extending out of the main frame; and during dismounting, the dismounting button is pressed to cause the elastic buckle to retract into the main frame, so that the power taking device is separated from the electrifying guide rail.

13. The waterproof double-sided liquid crystal screen electronic shelf label system according to claim 10, wherein the power taking device further comprises a fixing via-hole, and the power taking device is fixedly mounted through the fixing via-hole and the fixing device of the waterproof double-sided liquid crystal screen electronic shelf label.

14. The waterproof double-sided liquid crystal screen electronic shelf label system according to claim 9, wherein the electrifying guide rail comprises a guide rail copper bar, through which the waterproof double-sided liquid crystal screen electronic shelf label is electrified.

15. The waterproof double-sided liquid crystal screen electronic shelf label system according to claim 9, wherein the electrifying guide rail comprises rotating devices located at both ends of the electrifying guide rail; and when the waterproof double-sided liquid crystal screen electronic shelf label is subjected to an external force, the rotating device of the electrifying guide rail rotates in a forced direction of the waterproof double-sided liquid crystal screen electronic shelf label, so as to reduce an impact force applied to the waterproof double-sided liquid crystal screen electronic shelf label by the external force.

16. A waterproof double-sided liquid crystal screen electronic shelf label system, comprising a waterproof double-sided liquid crystal screen electronic shelf label, a power taking device and an electrifying guide rail;

wherein the waterproof double-sided liquid crystal screen electronic shelf label comprises a main frame, a double-sided screen, a power connection member, and a fixing member;

the double-sided screen is fixed in the main frame, and the power connection member and the fixing member are located at a lateral side of the main frame;

the power connection member is configured to supply power to the double-sided screen;

the fixing member is configured to fix and mount the main frame of the electronic shelf label;

the double-sided screen is configured to display information on both sides of the double-sided screen;

the waterproof double-sided liquid crystal screen electronic shelf label is fixedly mounted with the power taking device, and the power taking device is mounted on the electrifying guide rail;

the power taking device is configured to supply power to the waterproof double-sided liquid crystal screen electronic shelf label through the electrifying guide rail;

the electrifying guide rail comprises rotating devices located at both ends of the electrifying guide rail; and when the waterproof double-sided liquid crystal screen electronic shelf label is subjected to an external force, the rotating device of the electrifying guide rail rotates in a forced direction of the waterproof double-sided liquid crystal screen electronic shelf label, so as to reduce an impact force applied to the waterproof double-sided liquid crystal screen electronic shelf label by the external force.

* * * * *